United States Patent

Singleton

(10) Patent No.: US 9,497,603 B1
(45) Date of Patent: Nov. 15, 2016

(54) SYSTEM FOR PROVIDING MULTIMEDIA MESSAGES TO A MOBILE DEVICE AND METHOD THEREOF

(75) Inventor: Larry Clement Edward Singleton, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 1185 days.

(21) Appl. No.: 12/107,175

(22) Filed: Apr. 22, 2008

(51) Int. Cl.
*H04W 4/14* (2009.01)
*H04W 4/12* (2009.01)

(52) U.S. Cl.
CPC ................. *H04W 4/14* (2013.01); *H04W 4/12* (2013.01)

(58) Field of Classification Search
CPC ...................................................... H04W 4/14
USPC ......... 455/141.1, 418, 566, 550.1, 466, 403, 455/412.1–412.2; 370/313, 352, 395.3
See application file for complete search history.

(56) References Cited

U.S. PATENT DOCUMENTS

| | | | |
|---|---|---|---|
| 7,181,538 B2 * | 2/2007 | Tam | H04W 4/18 379/88.13 |
| 7,430,284 B2 * | 9/2008 | Dudley | H04L 12/5895 379/112.07 |
| 7,486,970 B2 * | 2/2009 | Kim et al. | 455/566 |
| 7,630,705 B2 * | 12/2009 | Galicia et al. | 455/414.1 |
| 7,649,877 B2 * | 1/2010 | Vieri et al. | 370/352 |
| 8,086,222 B2 * | 12/2011 | Vaananen | 455/412.1 |
| 2005/0020250 A1 * | 1/2005 | Chaddha et al. | 455/414.1 |
| 2006/0194572 A1 * | 8/2006 | Fresonke et al. | 455/414.1 |
| 2007/0026849 A1 * | 2/2007 | Brunel et al. | 455/418 |
| 2007/0173268 A1 * | 7/2007 | Le Bodic et al. | 455/466 |
| 2008/0242325 A1 * | 10/2008 | Bandera et al. | 455/466 |
| 2009/0052359 A1 * | 2/2009 | Yerubandi et al. | 370/310 |
| 2009/0190899 A1 * | 7/2009 | Bangalore | 386/126 |

* cited by examiner

*Primary Examiner* — Michael T Vu

(74) *Attorney, Agent, or Firm* — Raffi Gostanian

(57) ABSTRACT

A system for providing multimedia messages to a mobile device and a method thereof that includes a server structured to receive and forward multimedia messages. In the system, the server may include a processor structured to receive a multimedia message. When the multimedia message is received, the processor may determine a multimedia standard operable with the mobile device, and direct the formatting of the multimedia message in accordance with the standard. The formatting may be done by the processor itself or another means for formatting the multimedia message. Further, the system may notify the mobile device that the multimedia message has been received and send the formatted multimedia message to the mobile device based on a response to the notification.

20 Claims, 4 Drawing Sheets

SYSTEM FOR PROVIDING MULTIMEDIA MESSAGES TO A MOBILE DEVICE AND METHOD THEREOF

FIELD OF THE INVENTION

The present invention relates to multimedia messaging in a mobile environment. More particularly, and not by way of limitation, the present invention is directed to a system and method for providing multimedia messages to a mobile device and method thereof.

BACKGROUND OF THE INVENTION

In the art, there exists a Multimedia Messaging Service (MMS) that is fully specified by standards organizations, including 3GPP, 3GPP2, and the Open Mobile Alliance (OMA). MMS is an evolution of the Short Message Service (SMS) and is designed to send and receive multimedia messages such as graphics or pictures, video, audio, etc. However, implementation of the MMS is a slow process due to factors such as providing universal mobile device support and universal network interoperability. It is estimated that it will take several years before MMS technology is ubiquitous.

As an alternative to MMS, and primarily implemented at the time in Asian countries, Voice SMS is an emerging technology and is based on technology similar to that of SMS text messaging. In Voice SMS, a user records a voice message with a service, and an SMS text message is sent by the service to an intended recipient of the recorded message indicating that they have received a Voice SMS from the user. The notification to the intended recipient may also include a phone number to call in which to retrieve the voice message.

Since SMS text messaging is provided for most mobile devices, there are no mobile device configuration or interoperability problems with Voice SMS as are associated with MMS.

However, there may be instances where it is desirable to forward the multimedia message, such as a voice message, to a mobile device in a format that is compatible with the mobile device.

Further, it may be desirable to convert the multimedia message, for example, using a speech-to-text conversion program, and provide the contents of the multimedia message to the recipient in a text message format. This latter example may be useful for situations such as when the system determines that the intended recipient may be deaf, or when the intended recipient indicates to the system that they are in an environment where retrieving voice messages is not possible, such as in a meeting.

Also, it may be desirable in situations when a text message is being sent from a user to a recipient for the text message to be converted to a voice message, for example, when the system determines that the intended recipient may have sight problems.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a method for providing multimedia messages to a mobile device. The method includes determining a standard operable with the mobile device into which to format a multimedia message received at a server; formatting the multimedia message according to the standard; and sending a notification to the mobile device that the multimedia message has been received for the mobile device.

The method may further comprise receiving a response from the mobile device to the notification and sending the formatted multimedia message to the mobile device. Alternatively, the formatted multimedia message may be provided to the mobile device via a recorded voice message, via email, a website, or even by a data center operator.

In another aspect, the present invention is directed to a system for providing multimedia messages to a mobile device. The system may comprise a server structured to receive and forward multimedia messages. The server may include a processor structured to receive a multimedia message, determine a multimedia standard operable with the mobile device, direct the formatting of the multimedia message in accordance with the standard, and send a notification to the mobile device that a multimedia message has been received for the mobile device.

In yet another aspect, the present invention is directed to a computer-readable medium comprising instructions for: determining a standard operable with the mobile device into which to format a multimedia message received at a server; formatting the multimedia message according to the standard; and sending a notification to the mobile device that the multimedia message has been received for the mobile device.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Reference will now be made in detail to exemplary embodiments of the present invention, examples of which are illustrated in the accompanying drawings.

Figure 1:
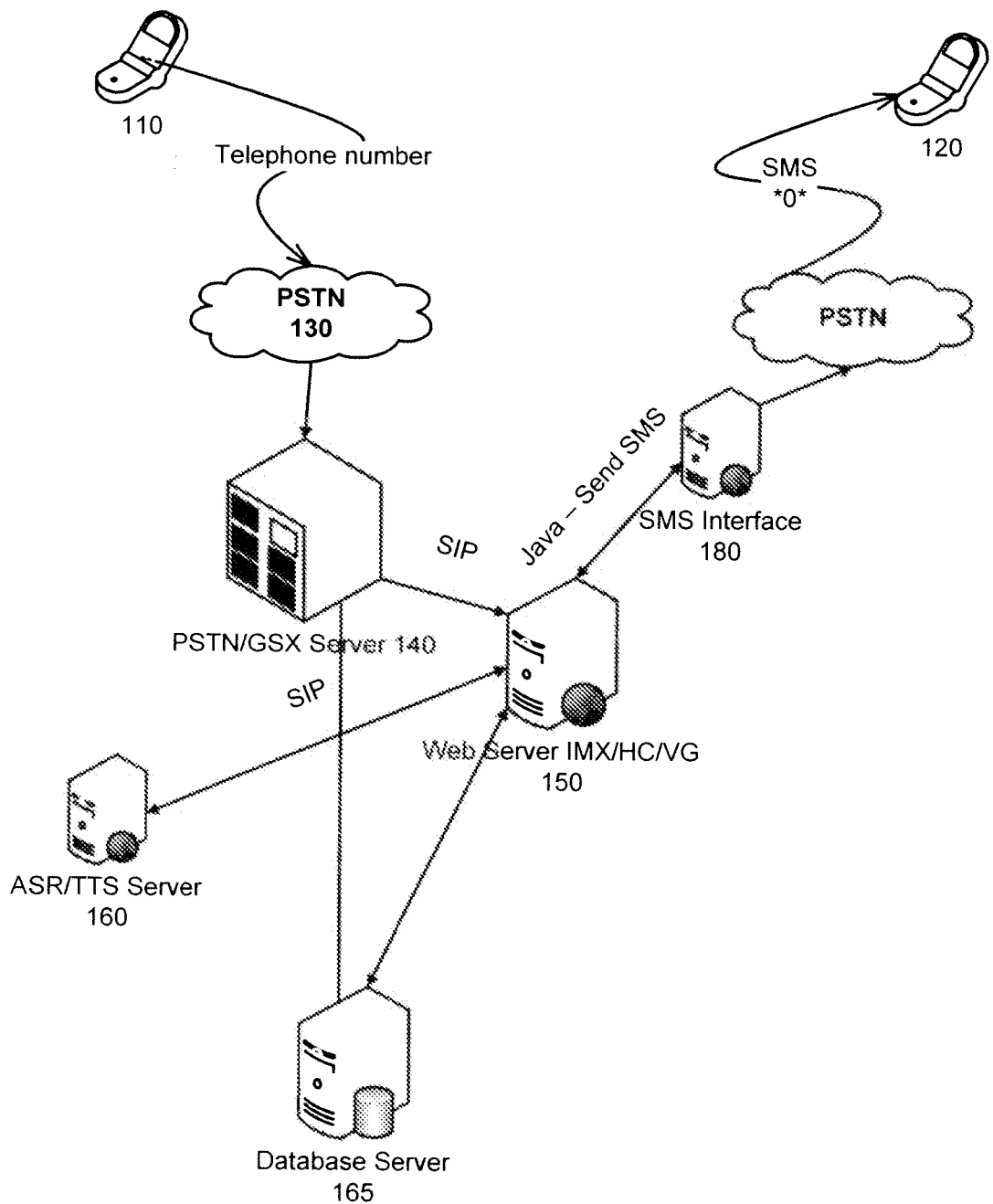
FIG. 1 illustrates a system for providing multimedia messages to a mobile device according to an exemplary embodiment of the invention.

FIG. 1 illustrates a system 100 for providing multimedia messages to a mobile device according to an exemplary embodiment of the invention.

In FIG. 1, to initiate sending a multimedia message from a user of a mobile device 110 to a recipient user of a mobile device 120, the user of the mobile device 110 may dial a phone number or indicate a network address for which to contact the recipient user of the mobile device 120. Note that the mobile devices 110/120 are not limited to cellular devices as shown in FIG. 1, but may include PDA devices, instant messaging devices, email devices, pagers, or even personal computers. Further, a server 150 of the invention may even be configured in exemplary embodiments of the invention to be used with fixed or stationary devices operable to communicate with one another. Also, in the present invention, multimedia messages may include graphics or pictures, video, audio, and Voice SMS, as well as Video SMS.

Accordingly, the user of the mobile device 110 sends a multimedia message, such as a telephone call through the public switched telephone network (PSTN) which may be routed to an interface of the PSTN, shown as Private Branch eXchange (PBX) server 140 of the system 100. For example, calls may be routed such as *npa-nxx-xxxx and *0* to server 140 for processing. Voice SMS or Video SMS may also be sent as the multimedia message using appropriate communication structure.

The PSTN/GSX server 140 may then route the telephone call to the integrated web portal MX/HC/VG server 150.

The server 150 may be structured to receive, process, store and/or forward multimedia messages, such as the telephone call, to the recipient user of the mobile device 120. In one embodiment of the invention, the server may include a processor (not shown) that is operable to determine a multimedia standard compatible with the mobile device 120, and direct the formatting of the multimedia message in accordance with the standard. This standard may include compression standards, streaming standards, etc.

For example, the server 150 may draw information from a database 165 that includes mobile device characteristics, such as network, architecture, or platform characteristics based on the telephone number or web address of known mobile devices and use these characteristics to format the multimedia message to a format compatible with the mobile device 120. This may facilitate sending multimedia messages between different networks, or when there are interoperability or proprietary technology differences among the mobile devices.

Or, the server 150 may hold or save the multimedia message and send an SMS message to the recipient user of the mobile device 120 to notify them that the user of mobile device 110 has sent them a multimedia message.

For example, an SMS message may be sent via an SMS Interface server 180 to the recipient user of the mobile device 120 to notify them that the user of mobile device 110 has sent them a multimedia message.

At this point, in exemplary embodiments, the recipient user of the mobile device 120 may choose several options to retrieve the message.

In one option, the recipient user of the mobile device 120 may choose to have the formatted multimedia message forwarded to the mobile device 120 from the server 150 where it may be appropriately viewed and/or listened to.

In another option, the recipient user of the mobile device 120 may choose to have the server 150 direct a speech-to-text conversion of the multimedia message via ASR/TTS server 160 and forward the text message to the mobile device 120. Alternatively, in situations where there is a text message sent from the mobile device 110, the server 150 may direct converting the text message into speech and voice mail and forward the voice mail to the mobile device 120.

Further, the recipient user of the mobile device 120 may choose to listen and/or view the multimedia message as it is stored by the server 150. Or, the message could be delivered via streaming to the mobile device. In any of the embodiments, a notification sent to the recipient user of the mobile device 120 may also include the text conversion of the multimedia message.

Figure 2:
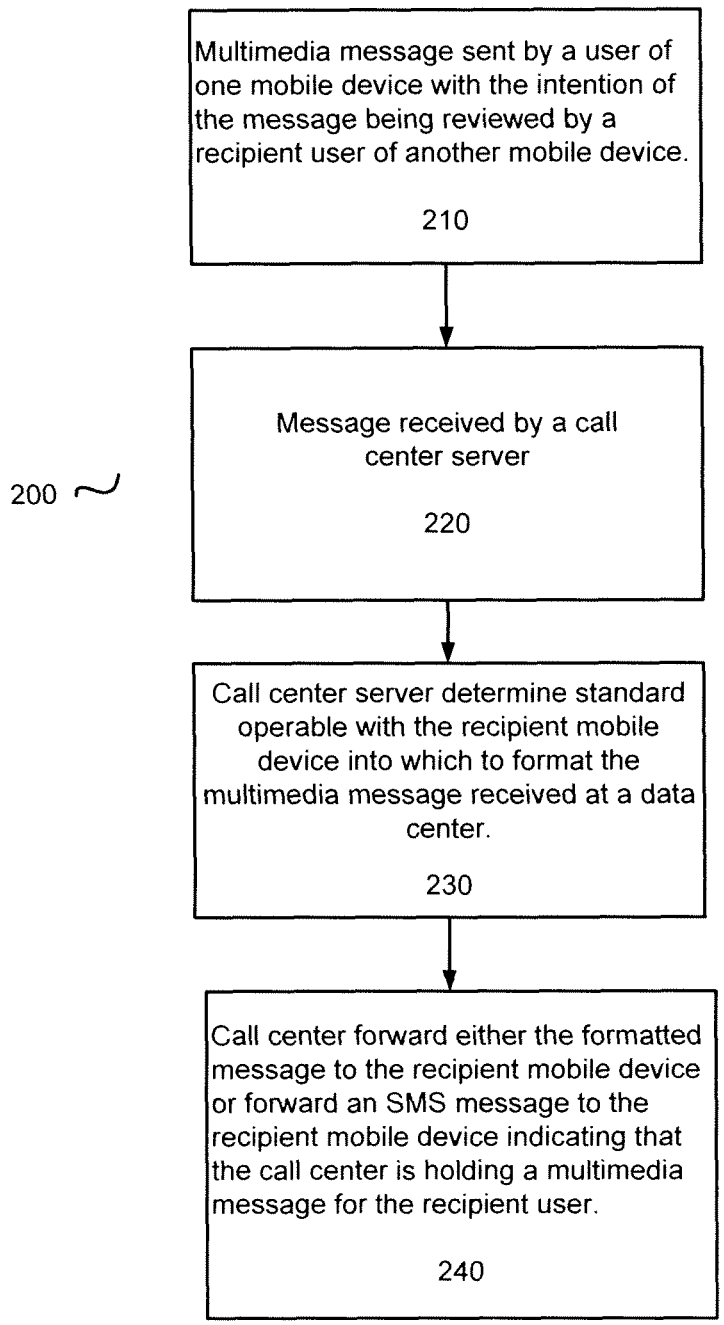
FIG. 2 is a flowchart illustrating a method for providing multimedia messages to a mobile device according to an exemplary embodiment of the invention.

FIG. 2 is a flowchart illustrating a method 200 for providing multimedia messages to a mobile device according to an exemplary embodiment of the invention. As shown in FIG. 2, in step 210, a multimedia message is sent by a user of one mobile device with the intention of its being reviewed by a recipient user of another mobile device.

In step 220, the message is received by a call center server.

Next, in step 230, the call center server determines whether there is a standard operable with the recipient mobile device into which to format the multimedia message received at a data center. This determination may be made on information from, for example, a database that includes mobile device characteristics, such as network, architecture, or platform characteristics based on the telephone number or web address of known mobile devices.

When a standard is determined, the call center, in step 240, may forward either the formatted message to the recipient mobile device or forward an SMS message to the recipient mobile device indicating that the call center is holding a multimedia message for the recipient user.

Figure 3:
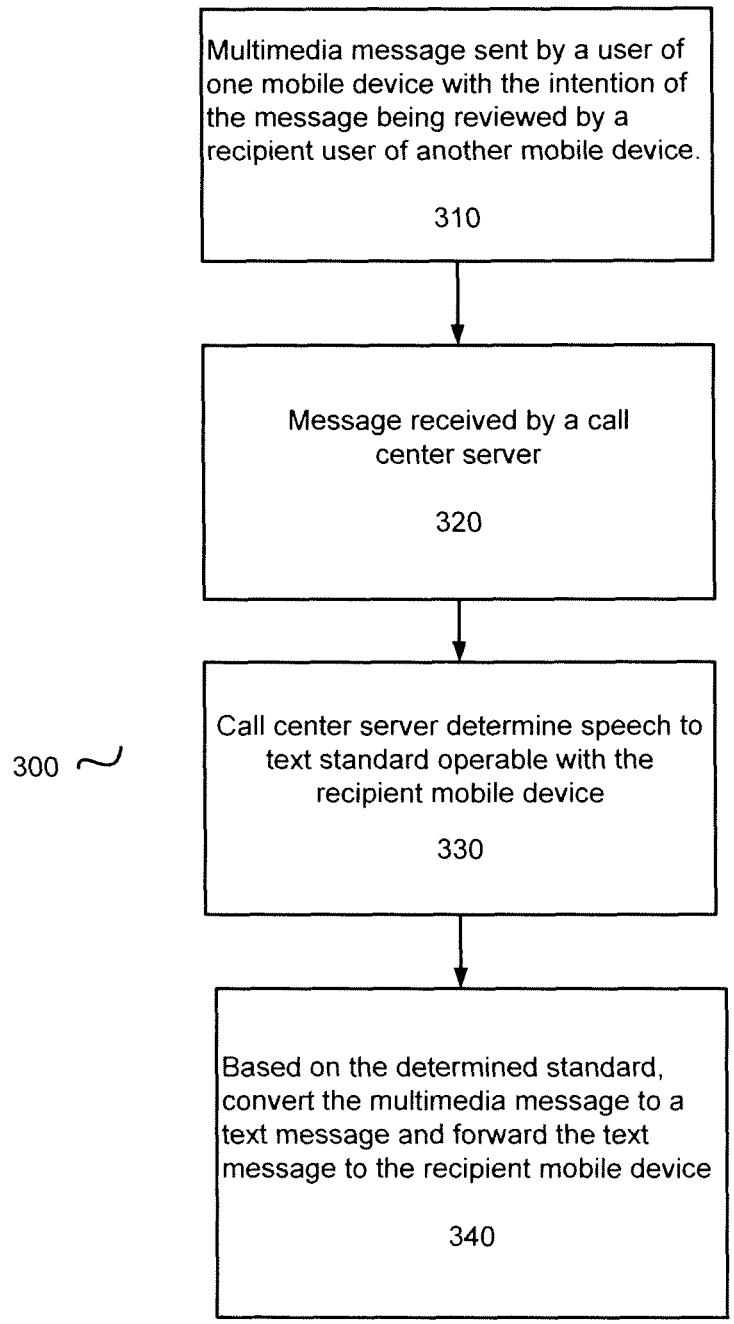
FIG. 3 is a flowchart illustrating another method for providing multimedia messages to a mobile device according to an exemplary embodiment of the invention.

FIG. 3 is a flowchart illustrating another method 300 for providing multimedia messages to a mobile device according to an exemplary embodiment of the invention. As shown in FIG. 3, in step 310, a multimedia message is sent by a user of one mobile device with the intention of its being reviewed by a recipient user of another mobile device.

In step 320, the message is received by a call center server.

Next, in step 330, the call center server determines whether there is a standard operable with the recipient mobile device into which to format the multimedia message received at a data center.

When the standard is that the multimedia message should be converted to a text message, the call center, in step 340, may convert the multimedia message to a text message and forward the text message to the recipient mobile device. In an exemplary method, based on the length of the text message, the text message may be sent as an SMS message.

Figure 4:
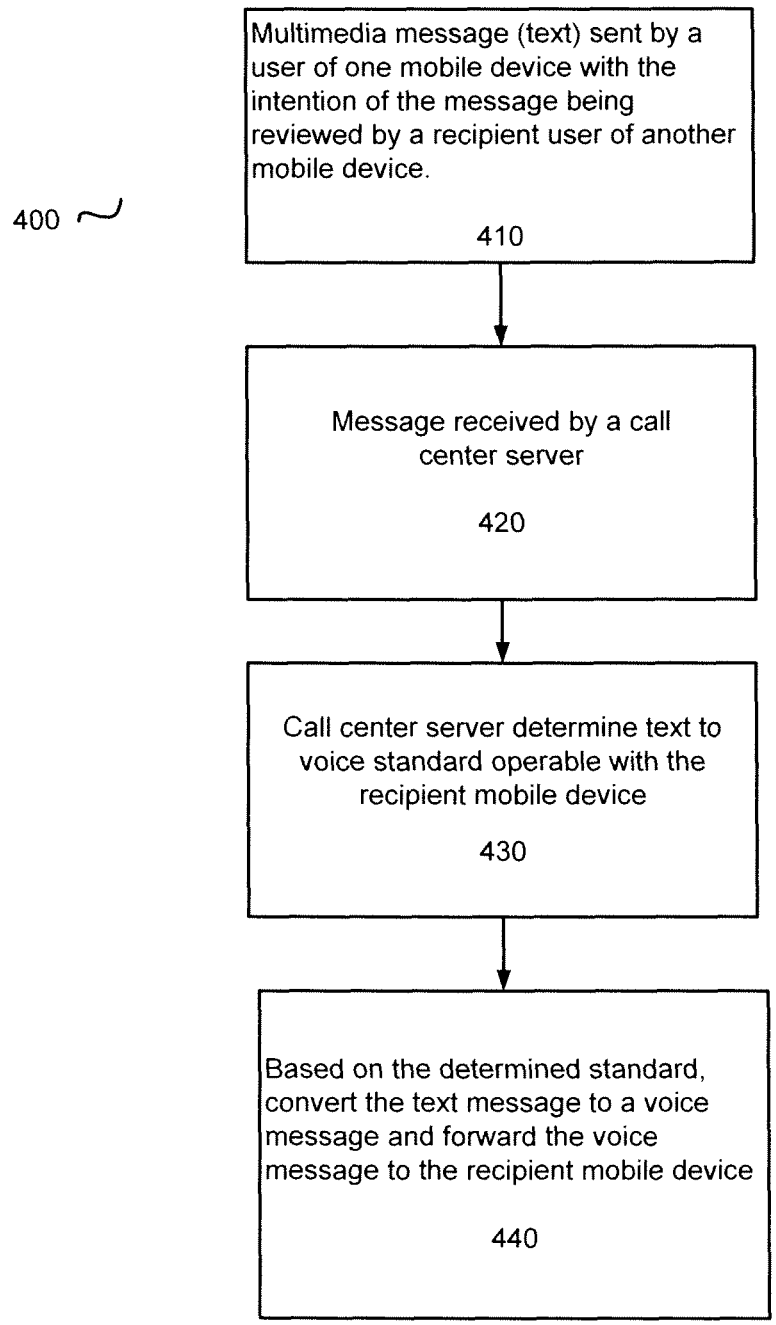
FIG. 4 is a flowchart illustrating yet another method for providing multimedia messages to a mobile device according to an exemplary embodiment of the invention.

FIG. 4 is a flowchart illustrating yet another method 400 for providing multimedia messages to a mobile device according to an exemplary embodiment of the invention. As shown in FIG. 4, in step 410, a text message is sent by a user of one mobile device to a recipient user of another mobile device.

In step 420, the message is received by a call center server.

Next, in step 430, the call center server determines whether there is a standard operable with the recipient mobile device into which to format the multimedia message received at a data center.

When the standard is that the multimedia message should be converted to a voice message, the call center, in step 440, may convert the text message to a voice message and forward the voice message to the recipient mobile device.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method for providing multimedia messages to a mobile device, the method comprising:

determining a standard operable with the mobile device into which to format a multimedia message received at a data center;

formatting the multimedia message according to the standard, wherein the formatting of the multimedia message comprises retrieving information from a database to format the multimedia message to a format compatible with the mobile device, the information comprises mobile device characteristics and platform characteristics;

converting a text message into a voice message by a processor if the multimedia message has text; and sending a notification to the mobile device that the multimedia message has been received for the mobile device.

2. The method according to claim 1, further comprising receiving a response from the mobile device to the notification and sending the formatted multimedia message to the mobile device.

3. The method according to claim 1, further comprising receiving a response from the mobile device to the notification and providing the formatted multimedia message to the mobile device.

4. The method according to claim 3, wherein the formatted multimedia message is provided by one of a recorded voice message and a data center operator.

5. The method according to claim 1, wherein the multimedia message is the voice message and the voice message is formatted into the text message by automatic speech recognition.

6. The method according to claim 5, further comprising receiving a response from the mobile device to the notification and sending the text message to the mobile device.

7. The method according to claim 5, wherein the notification includes the text message.

8. The method according to claim 1, wherein the notification is a Short Message Service (SMS) message.

9. A system for providing multimedia messages to a mobile device, the system comprising:

a server structured to receive and forward multimedia messages; the server comprising:

a processor structured to receive a multimedia message, determine a multimedia standard operable with the mobile device, direct format of the multimedia message in accordance with the standard, wherein the directing the formatting of the multimedia message comprises retrieving information from a database to format the multimedia message to a format compatible with the mobile device, the information comprises mobile device characteristics and platform characteristics, convert a text message into a voice message by the processor if the multimedia message has text, and send a notification to the mobile device that the multimedia message has been received for the mobile device.

10. The system according to claim 9, wherein the processor is further structured to receive a response from the mobile device to the notification and send the formatted multimedia message to the mobile device.

11. The system according to claim 9, wherein the processor is further structured to receive a response from the mobile device to the notification and provide the formatted multimedia message to the mobile device.

12. The system according to claim 11, wherein the formatted multimedia message is provided by a recorded voice message.

13. The system according to claim 9, wherein the multimedia message is the voice message and the voice message is formatted into the text message by automatic speech recognition.

14. The system according to claim 13, wherein the server is further structured to receive a response from the mobile device to the notification and send the text message to the mobile device.

15. The system according to claim 9, wherein the multimedia message is one of a Voice SMS and Video SMS.

16. The system according to claim 9, wherein the notification is a Short Message Service (SMS) message.

17. A non-transitory computer-readable storage medium comprising instructions for:

determining a standard operable with the mobile device into which to format a multimedia message received at a data center;

formatting the multimedia message according to the standard, wherein the formatting of the multimedia message comprises retrieving information from a database to format the multimedia message to a format compatible with the mobile device, the information comprises mobile device characteristics and platform characteristics;

converting a text message into a voice message by a processor if the multimedia message has text; and sending a notification to the mobile device that the multimedia message has been received for the mobile device.

18. The non-transitory computer-readable storage medium according to claim 17, further comprising instructions for receiving a response from the mobile device to the notification and sending the formatted multimedia message to the mobile device.

19. The non-transitory computer-readable storage medium according to claim 17, further comprising instructions for receiving a response from the mobile device to the notification and providing the formatted multimedia message to the mobile device.

20. The non-transitory computer-readable storage medium according to claim 17, wherein the formatted multimedia message is provided by a recorded voice message.

* * * * *